United States Patent
Watase et al.

(10) Patent No.: US 9,696,949 B2
(45) Date of Patent: Jul. 4, 2017

(54) INFORMATION PROCESSING APPARATUS THAT HAS FUNCTION OF MULTI-UP PRINTING OF DIFFERENT PRINTING JOBS

(71) Applicant: KYOCERA DOCUMENT SOLUTIONS INC., Osaka (JP)

(72) Inventors: Shinichiro Watase, Osaka (JP); Haruhisa Sumimoto, Osaka (JP); Hiroshi Manabe, Osaka (JP); Tatsuya Hiwatari, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 15/174,652

(22) Filed: Jun. 6, 2016

(65) Prior Publication Data

US 2016/0364194 A1 Dec. 15, 2016

(30) Foreign Application Priority Data

Jun. 11, 2015 (JP) ................................. 2015-117965

(51) Int. Cl.
*G06F 3/12* (2006.01)
(52) U.S. Cl.
CPC .......... *G06F 3/1248* (2013.01); *G06F 3/1206* (2013.01); *G06F 3/1219* (2013.01); *G06F 3/1285* (2013.01)
(58) Field of Classification Search
None
See application file for complete search history.

(56) References Cited

U.S. PATENT DOCUMENTS

| | | | | |
|---|---|---|---|---|
| 7,385,712 B2 * | 6/2008 | Nakagiri | ............... | G06F 3/1208 358/1.12 |
| 7,464,335 B2 * | 12/2008 | Nakagiri | ............... | G06F 3/1204 358/1.15 |
| 7,589,848 B2 * | 9/2009 | Kadowaki | ............. | G06F 3/1217 358/1.13 |
| 7,839,531 B2 * | 11/2010 | Sugiyama | .......... | H04N 1/00957 358/1.12 |

(Continued)

FOREIGN PATENT DOCUMENTS

JP 2002-140176 A 5/2002

*Primary Examiner* — Dung Tran
(74) *Attorney, Agent, or Firm* — Li & Cai Intellectual Property (USA) Office

(57) ABSTRACT

An information processing apparatus includes: an operation input device; a drawing command reception circuit that receives, based on an instruction to execute a printing job, a drawing command from an application program, and converts it into an intermediate code to output it; an intermediate code storage that stores the output intermediate code; a layout determination circuit that takes out the intermediate code from the storage and corrects it by rearranging it; and a PDL generation circuit that converts the corrected intermediate code into a PDL and outputs the PDL. The layout determination circuit keeps, when there is an instruction to accumulate the printing job, the intermediate code of the printing job in the storage, and takes out, when there is an instruction to not accumulate the printing job, the intermediate code from the storage and corrects it by rearranging it based on an instruction.

6 Claims, 12 Drawing Sheets

(56) References Cited

U.S. PATENT DOCUMENTS

| | | | | |
|---|---|---|---|---|
| 8,045,202 B2* | 10/2011 | Shirai | G06F 3/1204 | |
| | | | 358/1.15 | |
| 8,185,504 B2* | 5/2012 | Hino | G06F 17/30271 | |
| | | | 707/662 | |
| 8,319,986 B2* | 11/2012 | Nakata | G06F 3/1204 | |
| | | | 358/1.14 | |
| 8,922,832 B2* | 12/2014 | Toda | G06F 3/1215 | |
| | | | 358/1.16 | |
| 2002/0163667 A1* | 11/2002 | Noda | G06K 15/00 | |
| | | | 358/1.15 | |
| 2005/0195434 A1* | 9/2005 | Ohara | G06F 3/1204 | |
| | | | 358/1.16 | |
| 2005/0200879 A1* | 9/2005 | Nakagiri | G06F 3/1204 | |
| | | | 358/1.13 | |
| 2005/0248811 A1* | 11/2005 | Nakagiri | G06F 3/1208 | |
| | | | 358/1.18 | |
| 2006/0209329 A1* | 9/2006 | Akiyama | G06F 3/1205 | |
| | | | 358/1.13 | |
| 2007/0044101 A1* | 2/2007 | Suzuki | G06F 3/1204 | |
| | | | 718/102 | |
| 2007/0109581 A1* | 5/2007 | Saitoh | G06F 3/1208 | |
| | | | 358/1.13 | |
| 2009/0161137 A1* | 6/2009 | Klave | G06F 3/1204 | |
| | | | 358/1.13 | |
| 2011/0286034 A1* | 11/2011 | Hirano | G06F 3/1205 | |
| | | | 358/1.15 | |
| 2013/0335768 A1* | 12/2013 | Kujirai | G06F 21/608 | |
| | | | 358/1.13 | |
| 2014/0022596 A1* | 1/2014 | Nakagiri | B42C 19/00 | |
| | | | 358/1.15 | |

* cited by examiner

US 9,696,949 B2

INFORMATION PROCESSING APPARATUS THAT HAS FUNCTION OF MULTI-UP PRINTING OF DIFFERENT PRINTING JOBS

INCORPORATION BY REFERENCE

This application claims the benefit of Japanese Priority Patent Application JP 2015-117965 filed Jun. 11, 2015, the entire contents of which are incorporated herein by reference.

FIELD

The present disclosure relates to an information processing apparatus that uses an image forming apparatus to print, and a non-transitory computer readable recording medium that records an information processing program.

BACKGROUND

For saving printing paper when data is printed, a typical printer driver installed in a PC (Personal Computer) has a function of a multi-up printing.

SUMMARY

According to an embodiment of the present disclosure, there is provided an information processing apparatus including: an operation input device that receives instructions from a user; a drawing command reception circuit that receives, based on an instruction from the user to execute a printing job, a drawing command of the printing job from an application program, converts the received drawing command of the printing job into an intermediate code with which layout of a printing page can be rearranged, and outputs the intermediate code; an intermediate code storage that stores the output intermediate code; a layout determination circuit that takes out the intermediate code stored in the intermediate code storage and corrects the intermediate code by rearranging the intermediate code based on an instruction from the user; and a Page Description Language (PDL) generation circuit that converts the corrected intermediate code into a PDL and outputs the PDL, in which the layout determination circuit keeps, when there is an instruction from the user to accumulate the printing job, the intermediate code of the printing job in the intermediate code storage, and takes out, when there is an instruction from the user to not accumulate the printing job, the intermediate code of the printing job from the intermediate code storage and corrects the intermediate code of the printing job by rearranging the intermediate code based on an instruction from the user.

According to an embodiment of the present disclosure, there is provided an information processing program that causes a computer to function as: a drawing command reception circuit that receives, based on an instruction from a user received via an operation input device to execute a printing job, a drawing command of the printing job from an application program, converts the received drawing command of the printing job into an intermediate code with which layout of a printing page can be rearranged, and outputs the intermediate code to an intermediate code storage so that the intermediate code storage stores the intermediate code; a layout determination circuit that takes out the intermediate code stored in the intermediate code storage and corrects the intermediate code by rearranging the intermediate code based on an instruction from the user; and a PDL generation circuit that converts the corrected intermediate code into a PDL and outputs the PDL, in which the layout determination circuit keeps, when there is an instruction from the user to accumulate the printing job, the intermediate code of the printing job in the intermediate code storage, and takes out, when there is an instruction from the user to not accumulate the printing job, the intermediate code of the printing job from the intermediate code storage and corrects the intermediate code of the printing job by rearranging the intermediate code based on an instruction from the user.

Therefore, it is possible to save printing paper by multi-up printing different printing jobs in one page or printing them on both surfaces of a page (duplex printing).

These and other objects, features and advantages of the present disclosure will become more apparent in light of the following detailed description of best mode embodiments thereof, as illustrated in the accompanying drawings.

BRIEF DESCRIPTION OF FIGURES

FIG. 12 is a diagram illustrating a flow in which a layout determination unit 11*d* carries out layout processing on all the intermediate codes of a printing job stored in the intermediate code storage unit 17*a*, and a PDL generation unit 11e converts the intermediate codes subjected to the layout processing into PDL, in addition to the processing of converting a series of drawing commands from the application program 11a into intermediate codes and storing them in the intermediate code storage unit 17a;

DETAILED DESCRIPTION

Hereinafter, an embodiment of the present disclosure will be described with reference to the drawings.

(General Outline)

First, a general outline will be described.

It has been general to perform multi-up printing of reducing in size and compositing a plurality of pages into one page, for saving printing paper. The multi-up printing is also called N-up. In addition, printing in which two pages are reduced in size and composited into one page is called 2in1 printing.

Figure 1:
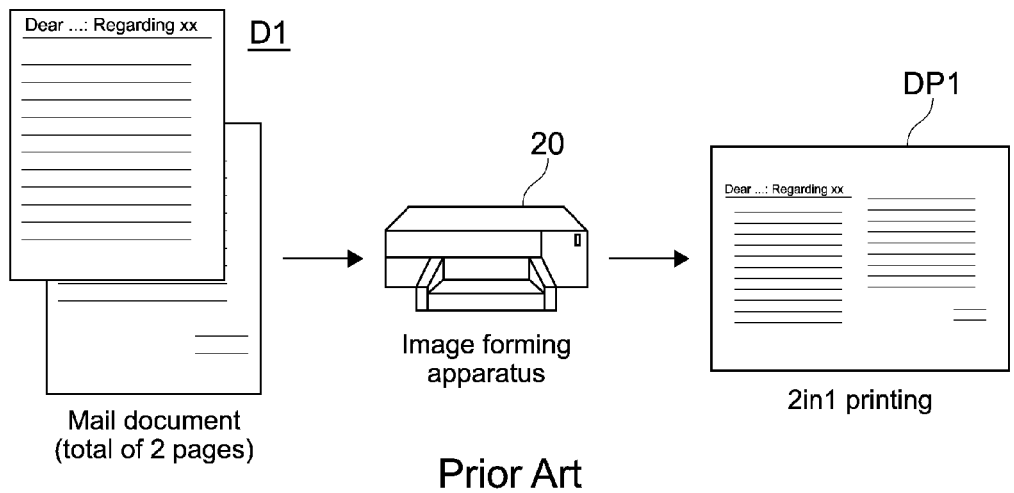
FIG. 1 is a diagram illustrating a state where, in a printing job of printing a mail document D1 including a total of two pages, a multi-up printed document DP1 obtained by 2in1 printing is printed by an image forming apparatus 20.

FIG. 1 is a diagram illustrating a state where, in a printing job of printing a mail document D1 including a total of two pages, a multi-up printed document DP1 obtained by 2in1 printing is printed by an image forming apparatus 20.

As described above, it has generally been possible to perform multi-up printing when printing one printing job. However, it has been impossible to perform multi-up printing or duplex printing of two or more printing jobs.

Figure 2:
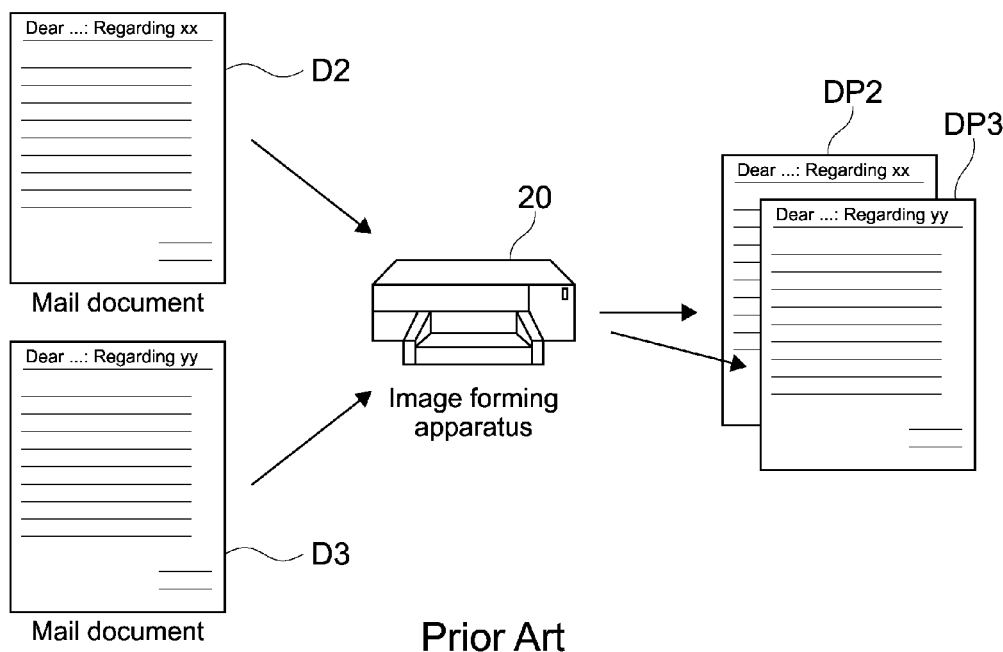
FIG. 2 is a diagram illustrating a state where, when printing two mail documents D2 and D3 each including one page, printed documents DP2 and DP3 are output separately from the image forming apparatus 20.

For example, as shown in FIG. 2, when printing two mail documents D2 and D3 each including one page, printed documents DP2 and DP3 have been output separately from the image forming apparatus 20.

If the mail documents D2 and D3 are printed by 2in1 printing in this case, two printed documents each having half the page blank are output.

Moreover, it has also been impossible to perform multi-up printing or duplex printing of two or more printing jobs instructed from different application programs.

Figure 3:
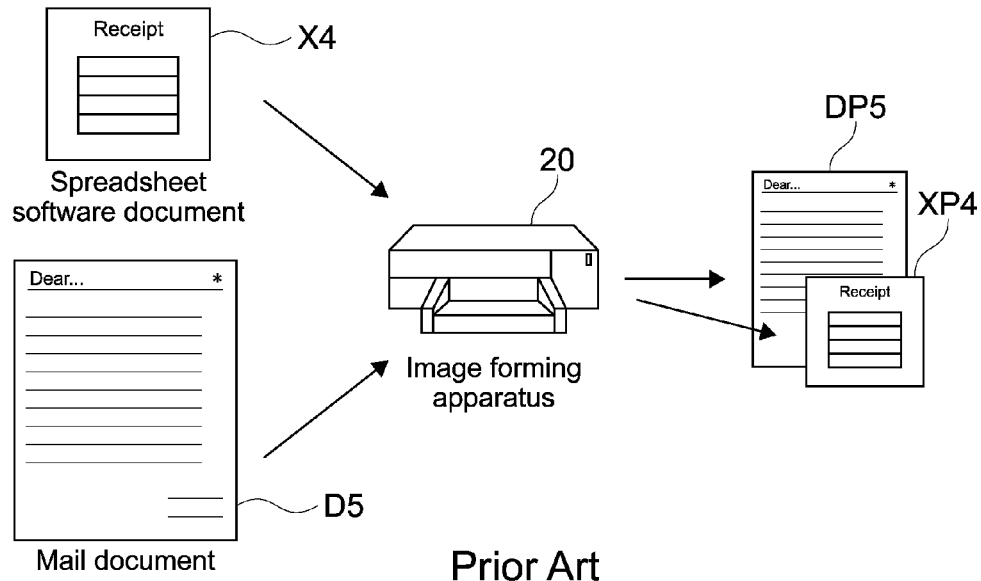
FIG. 3 is a diagram illustrating a state where different printed documents DP5 and XP4 are output from the image forming apparatus 20 when printing a document X4 instructed to be printed by spreadsheet software and a document D5 instructed to be printed by a word processor.

For example, as shown in FIG. 3, when printing a document X4 instructed to be printed from spreadsheet software and a document D5 instructed to be printed from a word processor using the image forming apparatus 20, different printed documents DP5 and XP4 are output.

Figure 4:
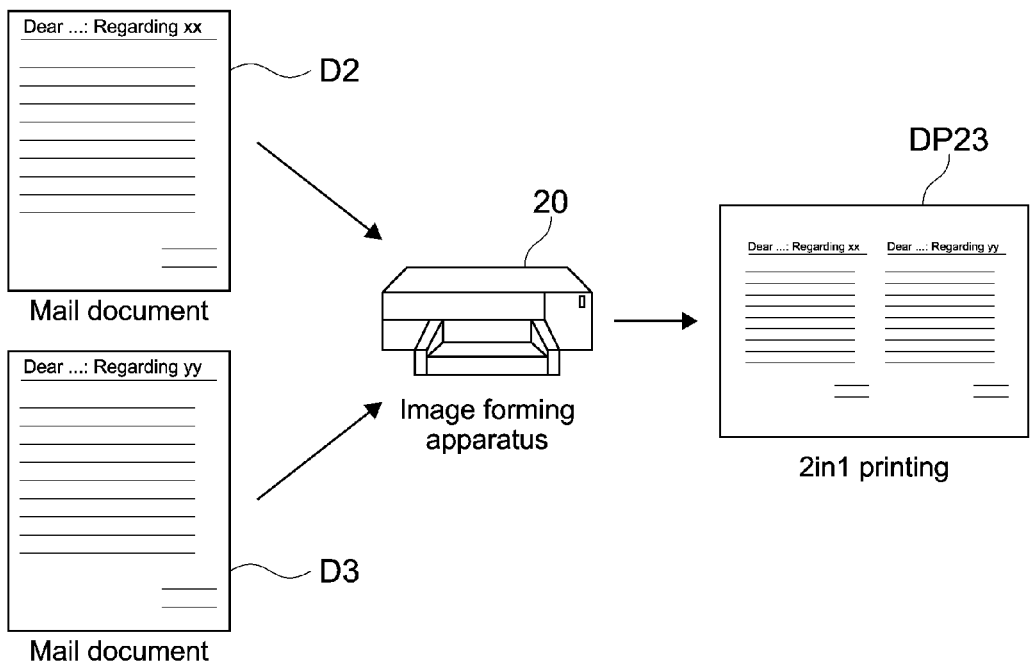
FIG. 4 is a diagram illustrating a state where the mail documents D2 and D3 of different printing jobs, that have been instructed to be printed from a word processor, are multi-up printed into one printed document DP23 by, for example, 2in1 printing.

However, using a printer driver of an information processing apparatus according to this embodiment, the mail documents D2 and D3 of different printing jobs, that have been instructed from the word processor, can be multi-up printed into one printed document DP23 by, for example, 2in1 printing as shown in FIG. 4.

Figure 5:
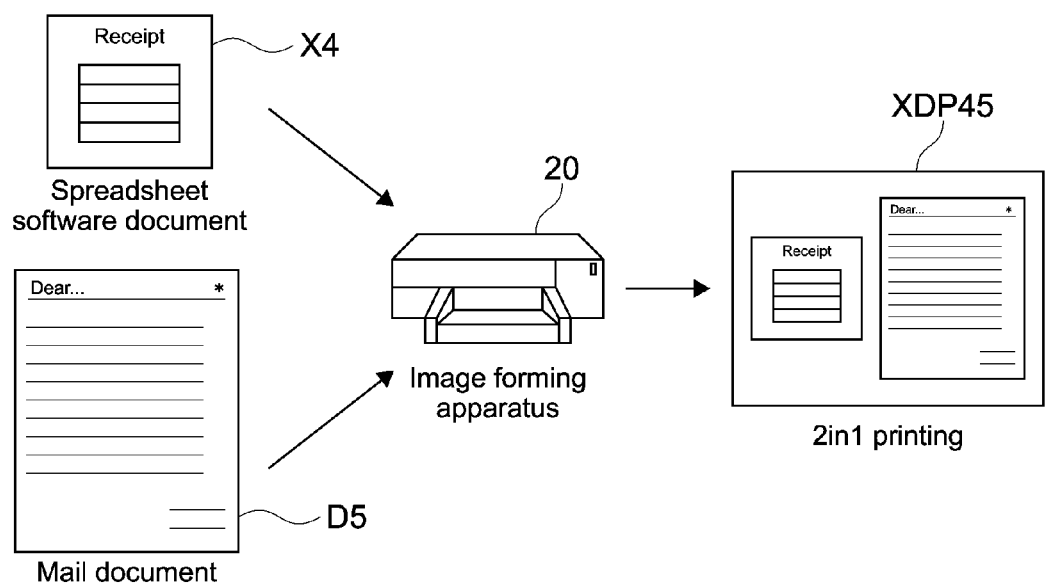
FIG. 5 is a diagram illustrating a state where different printing jobs instructed to be printed from different application programs are multi-up printed into one printed document XDP45 by, for example, 2in1 printing.

Using the printer driver of the information processing apparatus according to this embodiment, it is also possible to multi-up print different printing jobs instructed to be printed from different application programs (e.g., spreadsheet software and word processor software) into one printed document XDP45 by, for example, 2in1 printing as shown in FIG. 5.

The general outline has been described heretofore.

(Structure)

Next, the structure of the information processing apparatus 10 will be described. The information processing apparatus 10 may be constituted of dedicated hardware or software, or may be constituted of a generally-used computer. The structural diagram in the case where the information processing apparatus 10 is constituted of a generally-used computer is shown in FIG. 6.

Figure 6:
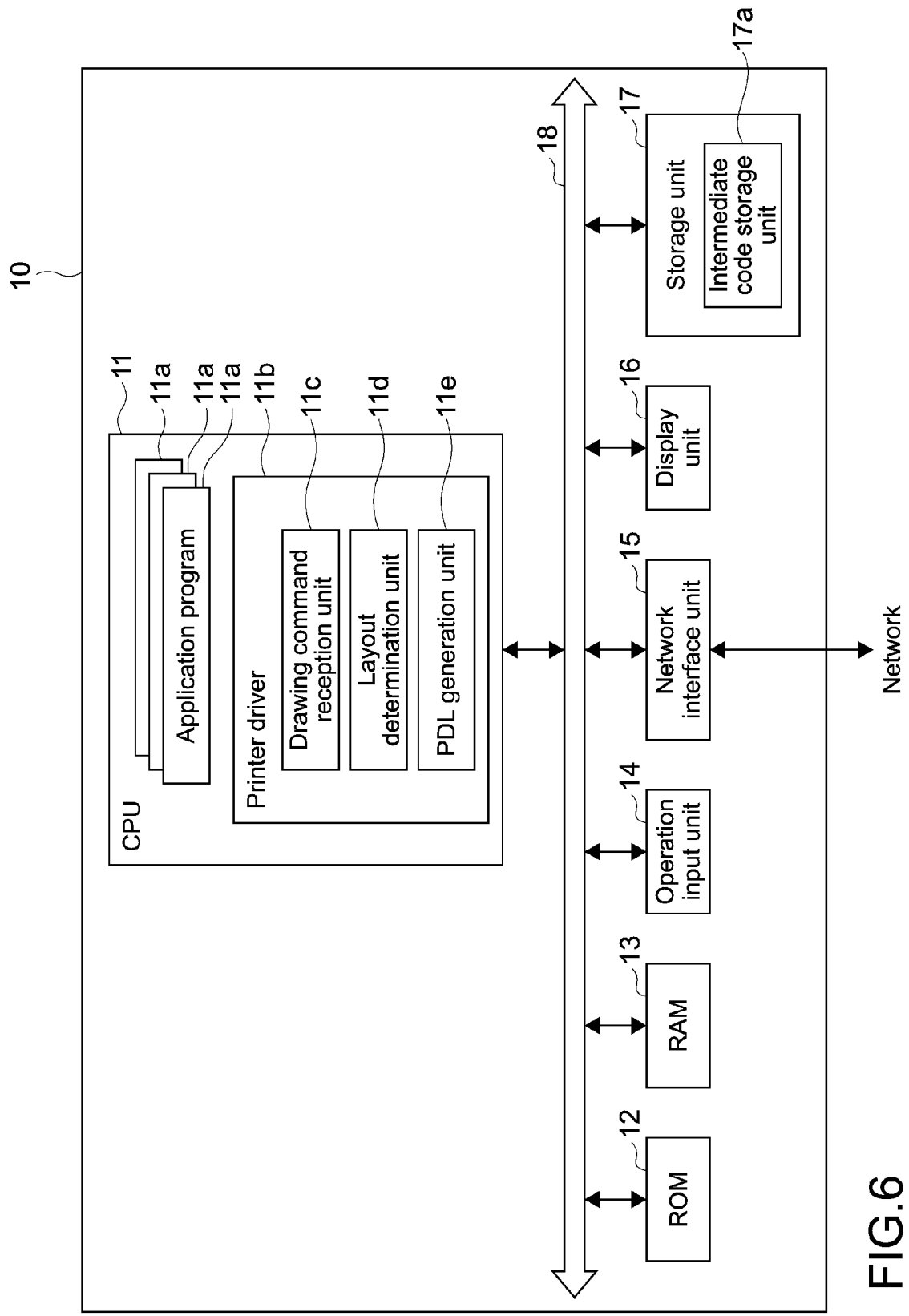
FIG. 6 is a block diagram illustrating a structure of an information processing apparatus according to an embodiment of the present disclosure.

As shown in FIG. 6, the information processing apparatus 10 includes a CPU (Central Processing Unit) 11, a ROM (Read Only Memory) 12, a RAM (Random Access Memory) 13, an operation input unit 14, a network interface unit 15, a display unit 16, and a storage unit 17, and those blocks are mutually connected via a bus 18.

The ROM 12 fixedly stores a plurality of programs such as firmware for executing various types of processing, and data. The RAM 13 is used as a working area of the CPU 11 and temporarily stores an OS (Operating System), various applications being executed, and various types of data being processed.

The storage unit 17 is, for example, an HDD (Hard Disk Drive), a flash memory, or other nonvolatile memories. The storage unit 17 stores an intermediate code to be described later in addition to the OS, various applications, and various types of data. It should be noted that an area where the intermediate code is stored will be referred to as intermediate code storage unit 17a. The intermediate code storage unit 17a will be described later.

The network interface unit 15 is connected to a network for exchanging information with an external apparatus.

Out of the plurality of programs stored in the ROM 12 and the storage unit 17, the CPU 11 develops a program corresponding to a command input via the operation input unit 14 in the RAM 13, and controls the display unit 16 and the storage unit 17 as appropriate according to the developed program.

The operation input unit 14 is, for example, a pointing device such as a mouse, a keyboard, a touch panel, or other operation devices.

The display unit 16 is, for example, a liquid crystal display, an EL (Electro-Luminescence) display, a plasma display, or a CRT (Cathode Ray Tube) display. The display unit 16 may be incorporated into the information processing apparatus 10 or may be connected externally.

It should be noted that as shown in FIG. 6, the CPU 11 includes application programs 11a and an printer driver 11b. The application programs 11a and the printer driver 11b are functional blocks that are realized by the CPU 11 executing the programs loaded to the RAM 13 from the ROM 12 or the like as a non-transitory computer readable recording medium.

The application programs 11a are software that instructs the printer driver 11b to print and are spreadsheet software, word processor software, and the like.

The printer driver 11b outputs to the image forming apparatus 20, based on printing instructions received from the application programs 11a, printing data described in PDL (Page Description Language) for actually printing by the image forming apparatus 20.

The CPU 11 executes a program loaded to the RAM 13 from the ROM 12 or the like as the non-transitory computer readable recording medium to function as a drawing command reception unit 11c, layout determination unit 11d, and PDL generation unit 11e of the printer driver 11b. The drawing command reception unit 11c, the layout determination unit 11d, and the PDL generation unit 11e will be described later.

The structure of the information processing apparatus 10 has been described heretofore.

(General Flow of Printing Data)

Next, a general flow of printing data at a time of a printing output will be described. The flow of printing data described herein is the flow of processing described above where the multi-up printing and duplex printing of different printing jobs cannot be performed.

Figure 7:
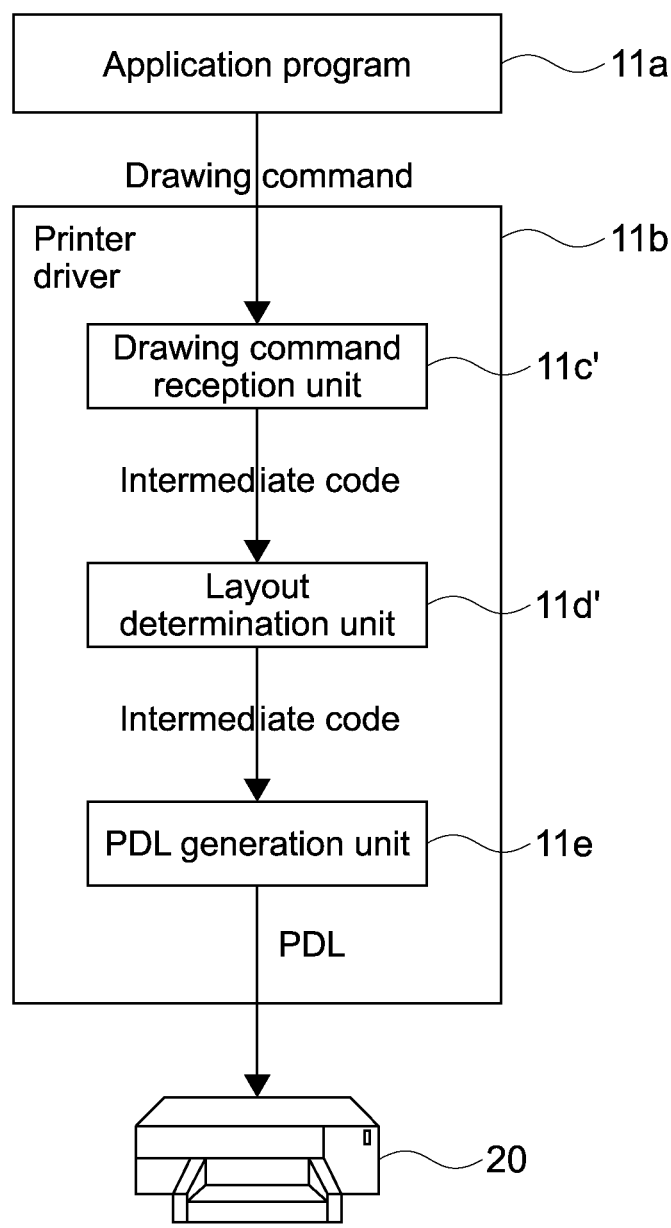
FIG. 7 is a diagram illustrating a typical flow of printing data at a time of a printing output.

FIG. 7 is a diagram illustrating the general flow of printing data at the time of a printing output.

As the application programs 11a transmit a series of drawing commands to the printer driver 11b as printing instructions (printing jobs), the drawing command reception unit 11c' receives the series of drawing commands and converts the received series of drawing commands into intermediate codes (to be described later).

The printing job converted into the intermediate codes by the drawing command reception unit 11c' is subjected to layout processing for multi-up printing, duplex printing, and the like in the layout determination unit 11d', and the intermediate codes are corrected so as to obtain layout designated by a user.

The intermediate codes corrected by the layout determination unit 11d' are converted into PDL by the PDL generation unit 11e and output to the image forming apparatus 20.

As described above, the printing job processing is generally carried out on a serial flow. Therefore, for example, when layout of one printing job is determined by the layout determination unit 11d', layout of the other printing job is already determined and the other printing job is converted into PDL by the PDL generation unit 11e, or a conversion into an intermediate code is being carried out in the drawing command reception unit 11c'. Consequently, it has been impossible for the layout determination unit 11d' to be involved.

The general flow of printing data at the time of a printing output has been described heretofore.

(Flow of Printing Data of this Embodiment)

Next, a flow of printing data of this embodiment at the time of a printing output will be described.

Figure 8:
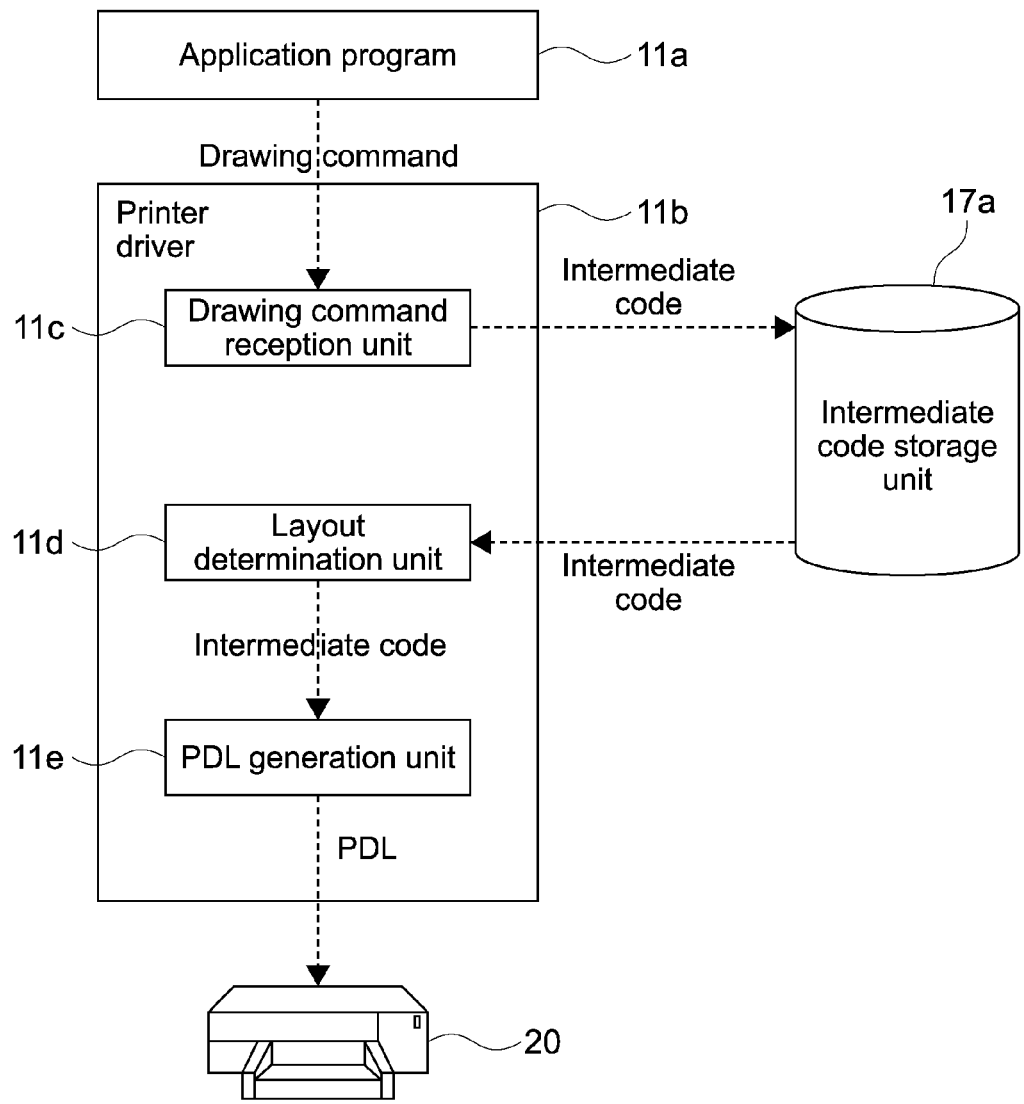
FIG. 8 is a diagram illustrating a flow of printing data in this embodiment at the time of a printing output.

FIG. 8 is a diagram illustrating the flow of printing data of this embodiment at the time of a printing output.

As the application programs 11a transmit a series of drawing commands to the printer driver 11b as printing instructions (printing jobs), the drawing command reception unit 11c receives the series of drawing commands, converts the received series of drawing commands into intermediate codes (to be described later), and stores the intermediate codes obtained by the conversion in the intermediate code storage unit 17a.

The task of accumulating intermediate codes of printing jobs in the intermediate code storage unit 17a is continued until a printing job, for which cancel of accumulation processing has been instructed, is received.

Upon cancel of the instruction to accumulate the intermediate codes of printing jobs, the layout determination unit 11d corrects the intermediate codes so as to obtain the instructed layout while targeting all the intermediate codes of the printing jobs stored in the intermediate code storage unit 17a.

The intermediate codes corrected by the layout determination unit 11d are converted into PDL data by the PDL generation unit 11e and output to the image forming apparatus 20.

As described above, since the layout processing is carried out across a plurality of printing jobs in this embodiment, the plurality of printing jobs are multi-up printed or duplex printed.

Heretofore, the flow of printing data of this embodiment at the time of a printing output has been described.

(Specific Processing Example)

Next, a specific processing example of this embodiment will be described.

First, the user instructs the application program 11a to print via the operation input unit 14 or the like.

Figure 9:
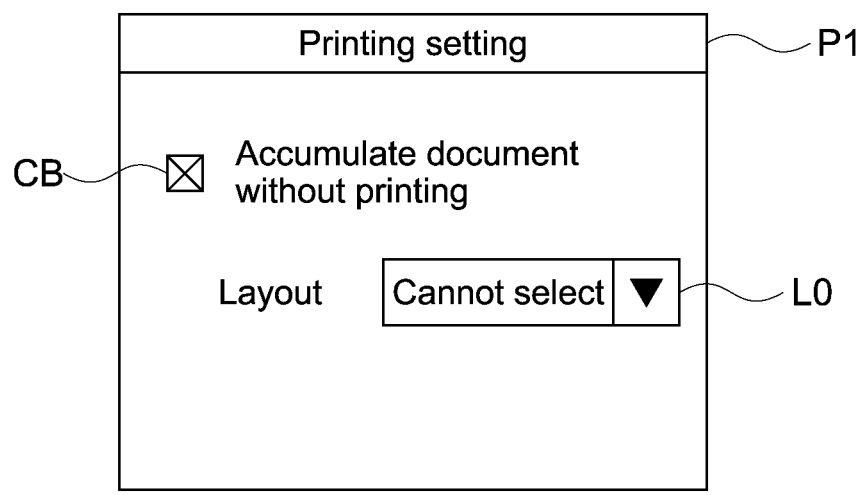
FIG. 9 is a diagram illustrating an example of a printing setting window P1 that is presented to a user by a printer driver 11*b* when the user instructs printing from an application program 11*a*.

Next, at a time the application program 11a instructs the printer driver 11b to print, the printer driver 11b presents a printing setting window P1 as that shown in FIG. 9 to the user.

On the printing setting window P1, the user checks a checkbox CB indicating "accumulate document without printing". As a check is put in the checkbox CB, a pulldown menu LO for instructing layout is grayed out so that the user cannot instruct layout.

Figure 10:
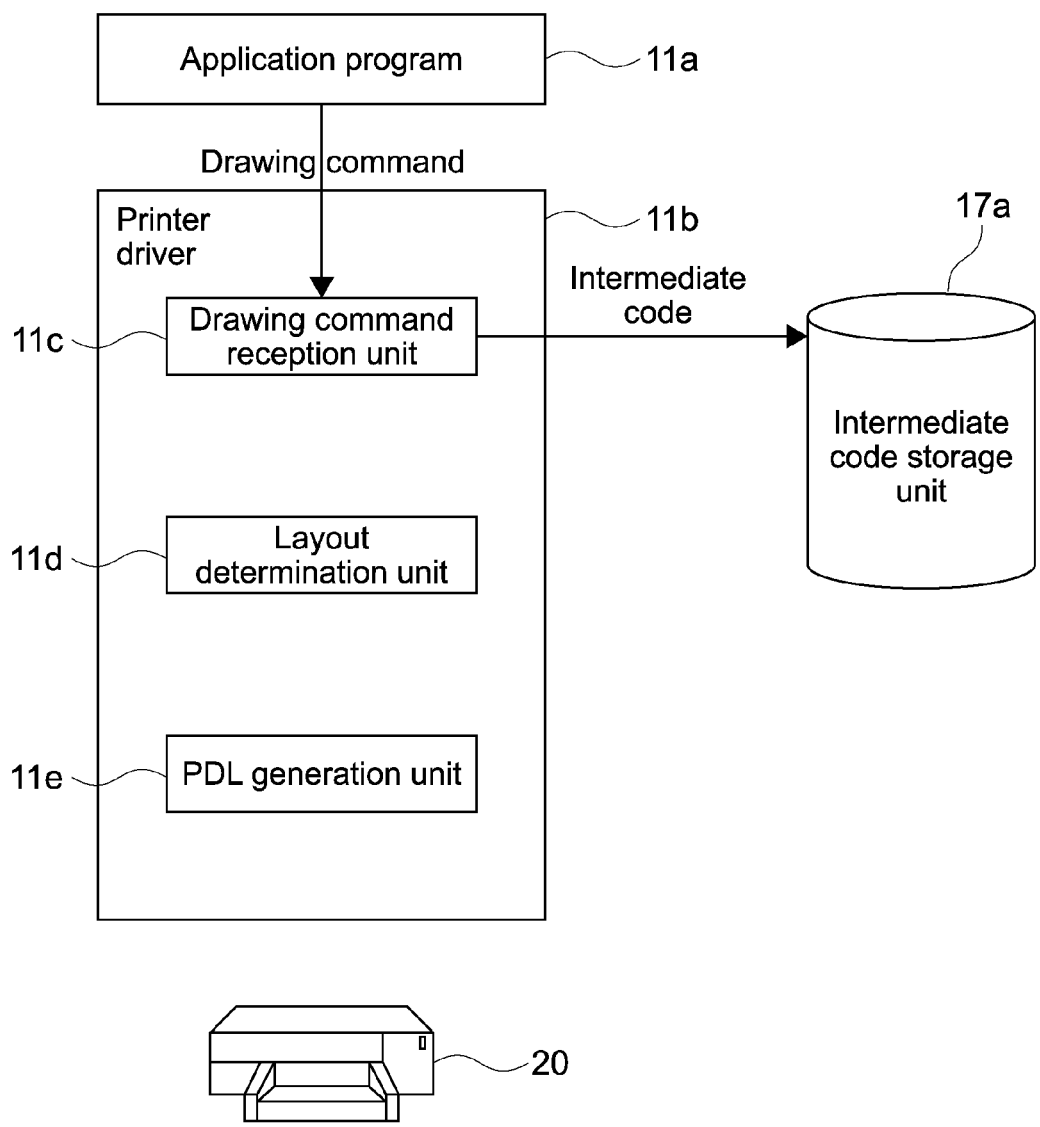
FIG. 10 is a diagram illustrating a flow in which, after a series of drawing commands from the application program 11*a* is converted into intermediate codes, the intermediate codes are stored in an intermediate code storage unit 17*a*, and printing processing of the printing job is temporarily ended.

As an instruction to execute a printing job is made while a check is put in the checkbox CB, a series of drawing commands of a printing job from the application program 11a are converted into intermediate codes as shown in FIG. 10 and stored in the intermediate code storage unit 17a after that, and printing processing of the printing job is temporarily ended.

Figure 11:
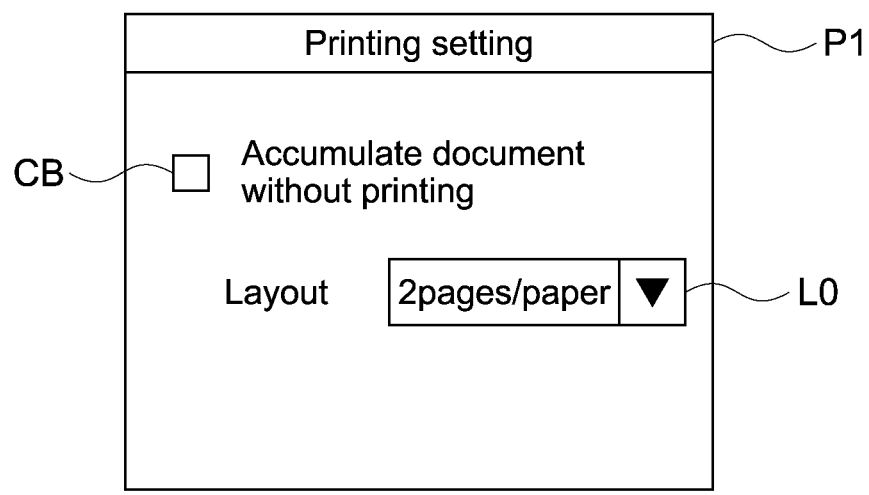
FIG. 11 is a diagram illustrating a state where a check is not put in a checkbox CB indicating "accumulate document without printing" on the printing setting window P1.

Next, when the user instructs another printing job for multi-up printing or duplex printing to be composited with the printing job described above, the user does not put a check on "accumulate document without printing" as shown in FIG. 11 on the printing setting window P1 presented by the printer driver 11b.

When a check is not put in the checkbox CB, grayout of the pulldown menu for instructing layout is canceled so that the user can instruct layout such as "2 pages/paper" (2in1 printing).

Figure 12:
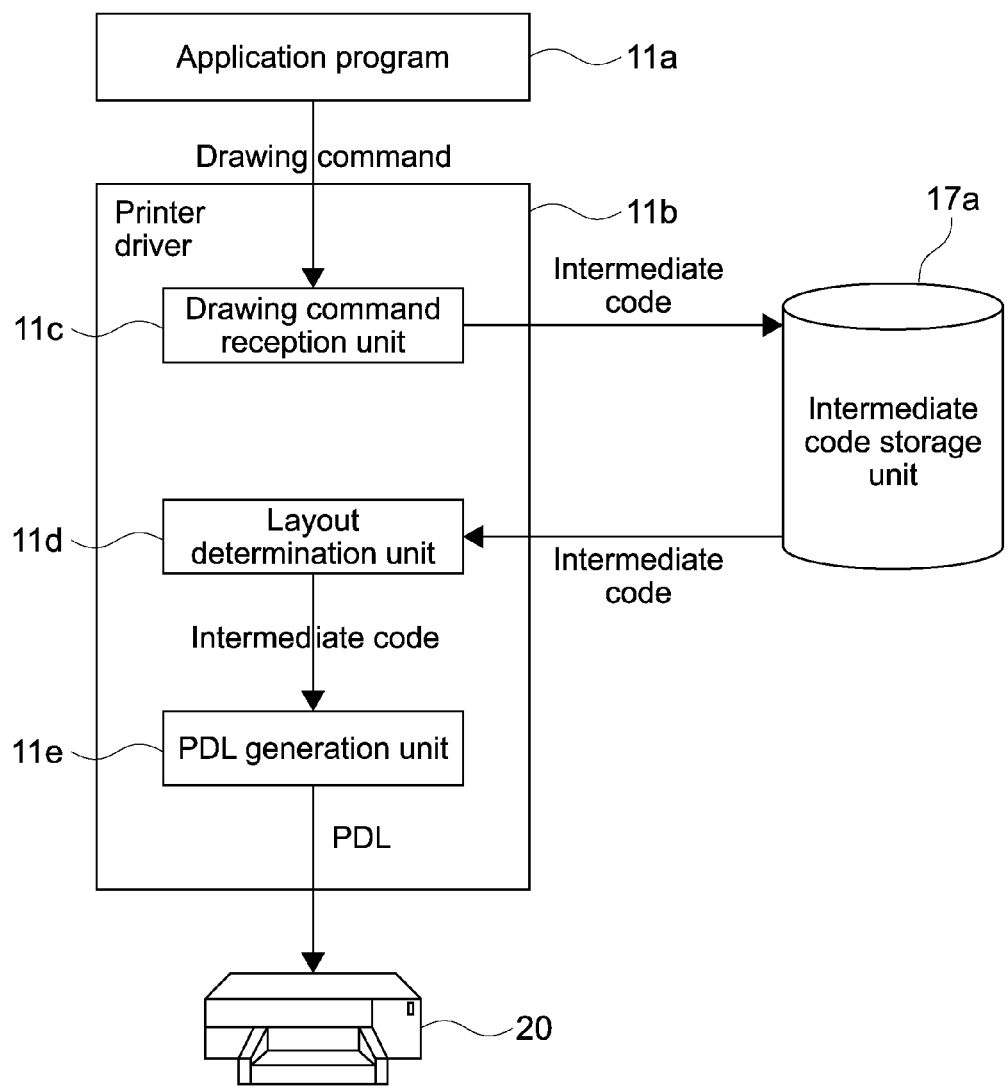

As the check in the checkbox CB is removed and an instruction to execute a printing job is made, the layout determination unit 11d carries out re-layout processing on all the intermediate codes of the printing jobs stored in the intermediate code storage unit 17a, and the PDL generation unit 11e converts the intermediate codes subjected to the re-layout processing into PDL and outputs them, in addition to the processing of converting a series of drawing commands of the printing jobs from the application programs 11a into intermediate codes and storing them in the intermediate code storage unit 17a as shown in FIG. 12.

The specific processing example of this embodiment has been described heretofore.

(Processing Flow)

Figure 13:
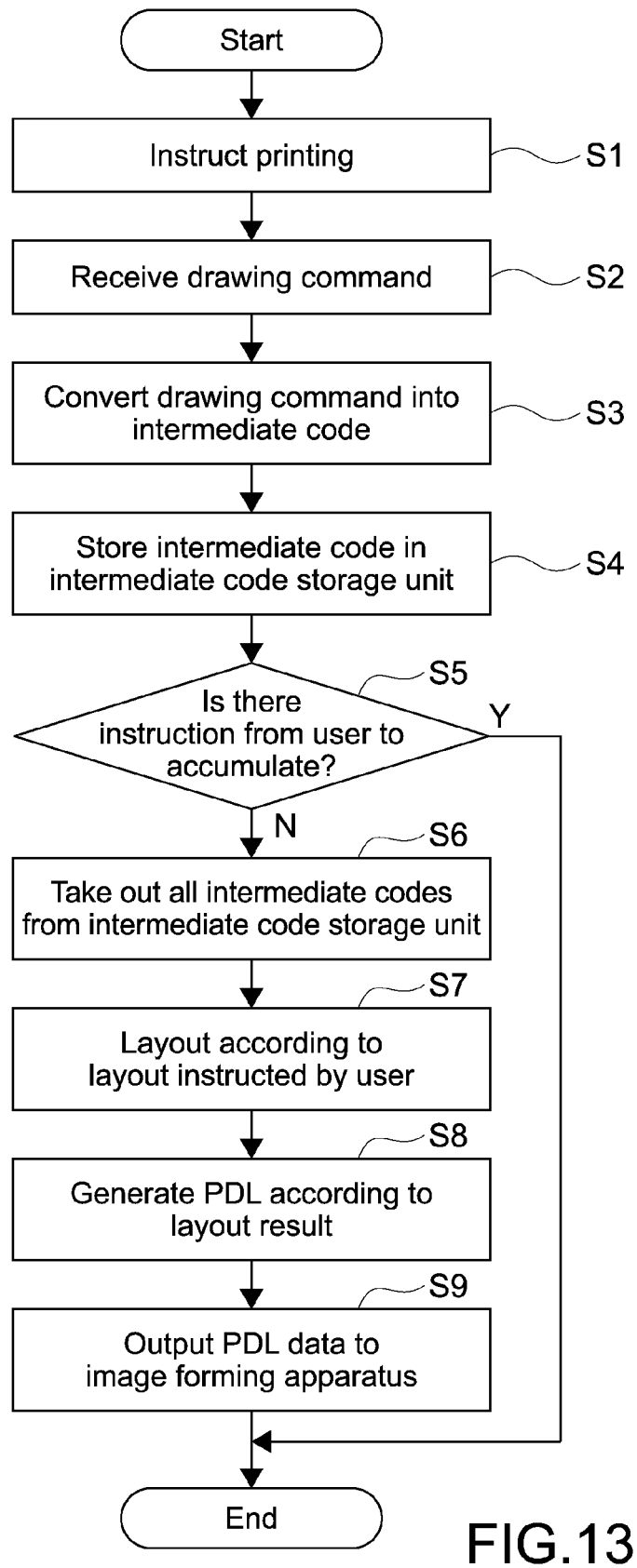
FIG. 13 is a flowchart for collectively explaining the processing flow of this embodiment.

Next, a processing flow of this embodiment will be described. FIG. 13 is a flowchart for collectively explaining the processing flow of this embodiment.

First, the user inputs a printing instruction to the application program 11a (Step S1). When inputting a printing instruction, the user inputs an instruction as to whether to accumulate a printing job on the printing setting window P1 presented by the printer driver 11b.

Next, the drawing command reception unit 11c of the printer driver 11b receives a series of drawing commands from the application program 11a based on the printing instruction (Step S2).

Next, the drawing command reception unit 11c converts the series of drawing commands received from the application program 11a into intermediate codes (Step S3).

Next, the drawing command reception unit 11c stores the intermediate codes obtained by the conversion in the intermediate code storage unit 17a (Step S4).

Next, the layout determination unit 11d judges whether an instruction to accumulate a printing job (intermediate codes) has been input by the user (Step S5).

When an instruction to accumulate is input (Y in Step S5), the layout determination unit 11*d* ends the processing as it is.

When an instruction to accumulate is not input (N in Step S5), the layout determination unit 11*d* takes out all the intermediate codes of the printing jobs stored in the intermediate code storage unit 17*a* (Step S6).

Next, the layout determination unit 11*d* corrects the intermediate codes that have been taken out and rearranges the layout based on the layout instruction from the user (Step S7).

Next, the PDL generation unit 11*e* generates PDL data based on the corrected intermediate codes (Step S8).

Next, the PDL data generated by the PDL generation unit 11*e* is output to the image forming apparatus 20 (Step S9).

The processing flow of this embodiment has been described heretofore.

(Intermediate Code)

Next, the intermediate code will be described. The intermediate code differs from a drawing command made by a calling function or the like in that the intermediate code can be temporarily stored and taken out as necessary so as to generate PDL data.

In addition to multi-up printing and duplex printing, the intermediate code can also be used for rearranging layout of printing pages, which includes changing an order of pages to be printed in booklet printing and the like.

Figure 14:
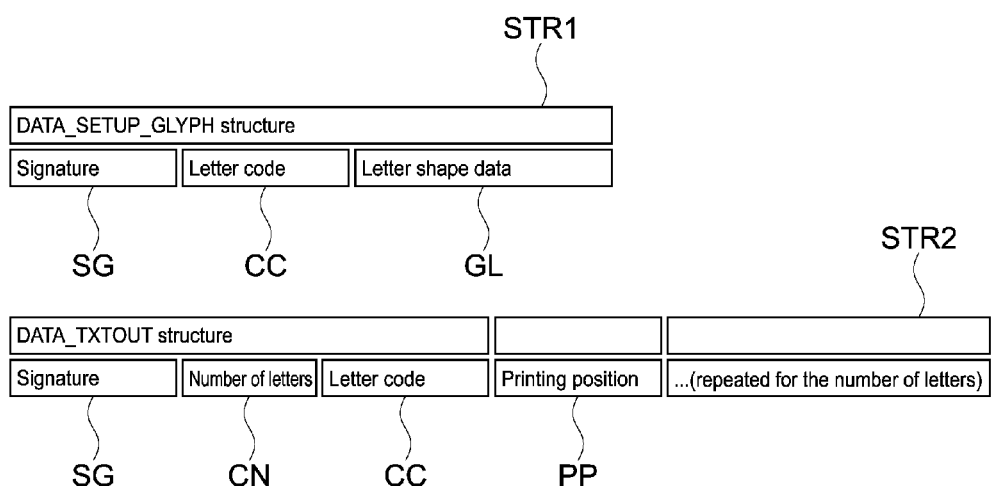
FIG. 14 is a diagram illustrating a format of the intermediate code.

As the intermediate code, there are, for example, a DATA_SETUP_GLYPH structure STR1 for transmitting letter shape data requisite for printing and a DATA_TXTOUT structure STR2 for designating which position to draw what letter as shown in FIG. 14.

For example, the DATA_SETUP_GLYPH structure STR1 includes a field for a signature SG indicating a type of intermediate code, a field for a letter code CC, and a field for letter shape data GL.

Moreover, for example, the DATA_TXTOUT structure STR2 includes a field for a signature SG indicating a type of intermediate code, a field for the number of letters CN to be printed, a field for a letter code CC of letters to be printed, and a field in which a printing position PP is repeated for the number of letters CN.

The intermediate code has been described heretofore.

(Supplementary Note)

As described above, The information processing apparatus 10 of this embodiment includes: the operation input unit 14 that receives instructions from a user; the drawing command reception unit 11*c* that receives, based on an instruction from the user to execute a printing job, a drawing command of the printing job from the application program 11*a*, converts the received drawing command of the printing job into an intermediate code with which layout of a printing page can be rearranged, and outputs the intermediate code; the intermediate code storage unit 17*a* that stores the output intermediate code; the layout determination unit 11*d* that takes out the intermediate code stored in the intermediate code storage unit 17*a* and corrects the intermediate code by rearranging the intermediate code based on an instruction from the user; and the PDL generation unit 11*e* that converts the corrected intermediate code into a PDL and outputs the PDL, the layout determination unit 11 d keeping, when there is an instruction from the user to accumulate the printing job, the intermediate code of the printing job in the intermediate code storage unit 17*a*, and taking out, when there is an instruction from the user to not accumulate the printing job, the intermediate code of the printing job from the intermediate code storage unit 17*a* and correcting the intermediate code of the printing job by rearranging the intermediate code based on an instruction from the user.

Therefore, it is possible to save printing paper by performing multi-up printing, which involves printing different printing jobs in one page, or duplex printing.

In addition, the present disclosure is not limited to the embodiment described above and can be variously modified without departing from the gist of the present disclosure.

What is claimed is:

1. An information processing apparatus, comprising:
 a Central Processing Unit (CPU);
 a display device;
 an operation input device that receives instructions from a user; and
 a storage device,
 wherein the CPU, by executing a printer driver, functions as:
  a drawing command reception circuit that i) receives, based on an instruction from the user to execute a printing job, a drawing command of the printing job from an application program, ii) converts the received drawing command of the printing job into an intermediate code with which layout of a printing page can be rearranged, and iii) outputs the intermediate code in the storage device;
  a layout determination circuit that takes out the intermediate code stored in the storage device, and corrects the intermediate code by rearranging the intermediate code based on an instruction from the user; and
  a Page Description Language (PDL) generation circuit that converts the corrected intermediate code into a PDL, and outputs the PDL to an image forming apparatus,
 wherein:
  the drawing command reception circuit accumulates in the storage device a plurality of intermediate codes, until a specified printing job, for which cancel of accumulation process of the intermediate code has been instructed, is received; and
  when the specified printing job, for which the cancel of the accumulation process of the intermediate code has been instructed, is received, the layout determination circuit takes out all the plurality of intermediate codes of a plurality of printing jobs from the storage device, and corrects all the plurality of intermediate codes by rearranging all the plurality of intermediate codes based on the instruction from the user, and
 wherein:
  the CPU, by executing the printer driver, presents a printing setting window on the display device, the printing setting window including a checkbox for indicating to accumulate the printing job without printing and a pulldown menu for instructing a layout of the printing job;
  (A) when a check is put on the checkbox,
   the pulldown menu for instructing the layout is grayed out so that the user cannot instruct the layout of the printing job, and
   when the instruction to execute the printing job with the check on the checkbox is made,
    the drawing command reception circuit converts a plurality of received drawing commands to a plurality of intermediate codes, and accumulates the plurality of intermediate codes in the storage device; and (B) when the check is not put on the checkbox,
the pulldown menu for instructing the layout is not grayed out so that the user can instruct the layout of the printing job, and
when the instruction to execute the printing job without the check on the checkbox is made,
the pulldown menu for instructing the layout is not grayed out so that the user can instruct the layout of the printing job, and
when an instruction from the user via the pulldown menu for instructing the layout is made,
the drawing command reception circuit converts a plurality of received drawing commands to a plurality of intermediate codes, and outputs the plurality of intermediate codes to the storage device, and
the layout determination circuit takes out all the plurality of intermediate codes of the plurality of printing jobs from the storage device, and corrects all the plurality of intermediate codes by rearranging all the plurality of intermediate codes based on the instruction.

2. The information processing apparatus according to claim 1,
wherein the drawing command reception circuit accumulates in the storage device the plurality of intermediate codes of the plurality of printing jobs that have been given from different application programs.

3. The information processing apparatus according to claim 1,
wherein the intermediate code is a code used at least for rearranging layout of a printing page for performing multi-up printing, duplex printing, and printing while changing an order of pages.

4. The information processing apparatus according to claim 3,
wherein the intermediate code includes a DATA_SETUP_GLYPH structure for transferring letter shape data requisite for printing and a DATA_TXTOUT structure for designating a position to draw a letter.

5. The information processing apparatus according to claim 4,
wherein the DATA_SETUP_GLYPH structure includes a field for a signature that indicates a type of intermediate code, a field for a letter code, and a field for letter shape data of the letter code.

6. The information processing apparatus according to claim 5,
wherein the DATA_TXTOUT structure includes a field for a signature that indicates a type of intermediate code, a field for the number of letters to be printed, a field for a letter code of letters to be printed, and a field in which a printing position is repeated for the number of letters.

* * * * *